(12) United States Patent
Bauer, Jr. et al.

(10) Patent No.: US 7,808,776 B2
(45) Date of Patent: Oct. 5, 2010

(54) APPARATUS AND METHODS FOR SUPPORTING A DISPLAY PANEL OF A PORTABLE INFORMATION HANDLING SYSTEM

(75) Inventors: John Albert Bauer, Jr., Round Rock, TX (US); Mark A. Schwager, Round Rock, TX (US); Jeremy J. Osborne, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 206 days.

(21) Appl. No.: 12/154,121

(22) Filed: May 20, 2008

(65) Prior Publication Data

US 2009/0290087 A1 Nov. 26, 2009

(51) Int. Cl.
*G06F 1/16* (2006.01)
(52) U.S. Cl. .................... 361/679.26; 349/58
(58) Field of Classification Search ............ 361/679.55, 361/679.26; 349/58
See application file for complete search history.

(56) References Cited

U.S. PATENT DOCUMENTS

| | | | | |
|---|---|---|---|---|
| 5,085,394 | A * | 2/1992 | Torii | 248/455 |
| 5,168,426 | A * | 12/1992 | Hoving et al. | 361/679.09 |
| 5,200,913 | A * | 4/1993 | Hawkins et al. | 361/679.09 |
| 5,333,116 | A * | 7/1994 | Hawkins et al. | 361/679.06 |
| D353,133 | S * | 12/1994 | Yamada et al. | D14/325 |
| 5,666,261 | A | 9/1997 | Aguilera | |
| 6,002,582 | A | 12/1999 | Yeager et al. | |
| 6,212,069 | B1 * | 4/2001 | Janik et al. | 361/679.47 |
| 6,356,440 | B2 * | 3/2002 | Selker | 361/679.55 |
| 6,366,935 | B2 * | 4/2002 | Hawkins et al. | 708/100 |
| 6,430,038 | B1 * | 8/2002 | Helot et al. | 361/679.05 |
| 6,674,642 | B1 * | 1/2004 | Chu et al. | 361/679.27 |
| 6,922,335 | B2 * | 7/2005 | Shimada et al. | 361/679.55 |
| 6,930,881 | B2 * | 8/2005 | Karidis et al. | 361/679.55 |
| 6,977,809 | B2 * | 12/2005 | Bovino | 361/679.55 |
| RE39,429 | E * | 12/2006 | Hawkins et al. | 708/100 |
| 7,184,263 | B1 * | 2/2007 | Maskatia | 361/679.27 |
| 7,224,580 | B2 * | 5/2007 | Shimada et al. | 361/679.27 |
| 7,251,127 | B2 * | 7/2007 | Ghosh et al. | 361/679.55 |
| 7,382,607 | B2 * | 6/2008 | Skillman | 361/679.55 |
| 7,403,378 | B2 * | 7/2008 | Lo et al. | 361/679.55 |
| 7,535,698 | B2 * | 5/2009 | Iwamoto et al. | 361/679.55 |
| 7,551,426 | B2 * | 6/2009 | Huang et al. | 361/679.02 |
| 7,561,414 | B2 * | 7/2009 | Li et al. | 361/679.26 |
| 7,586,743 | B2 * | 9/2009 | Lin | 361/679.55 |
| 7,639,494 | B2 * | 12/2009 | Lin | 361/679.55 |
| 7,652,873 | B2 * | 1/2010 | Lee | 361/679.06 |
| 2007/0041149 | A1 * | 2/2007 | Homer et al. | 361/681 |
| 2007/0177343 | A1 * | 8/2007 | Hsia | 361/683 |
| 2008/0024965 | A1 * | 1/2008 | Iwamoto et al. | 361/681 |

* cited by examiner

*Primary Examiner*—Lisa Lea-Edmonds
(74) *Attorney, Agent, or Firm*—O'Keefe, Egan, Peterman & Enders LLP

(57) ABSTRACT

Apparatus and methods for mounting a display panel of a portable information handling system such as a notebook or laptop computer. The apparatus and methods employ a display backing component having a stepwise-thickened central cross-sectional shape and distribution of mass that may be tailored to match the stress concentration of a display assembly.

26 Claims, 9 Drawing Sheets

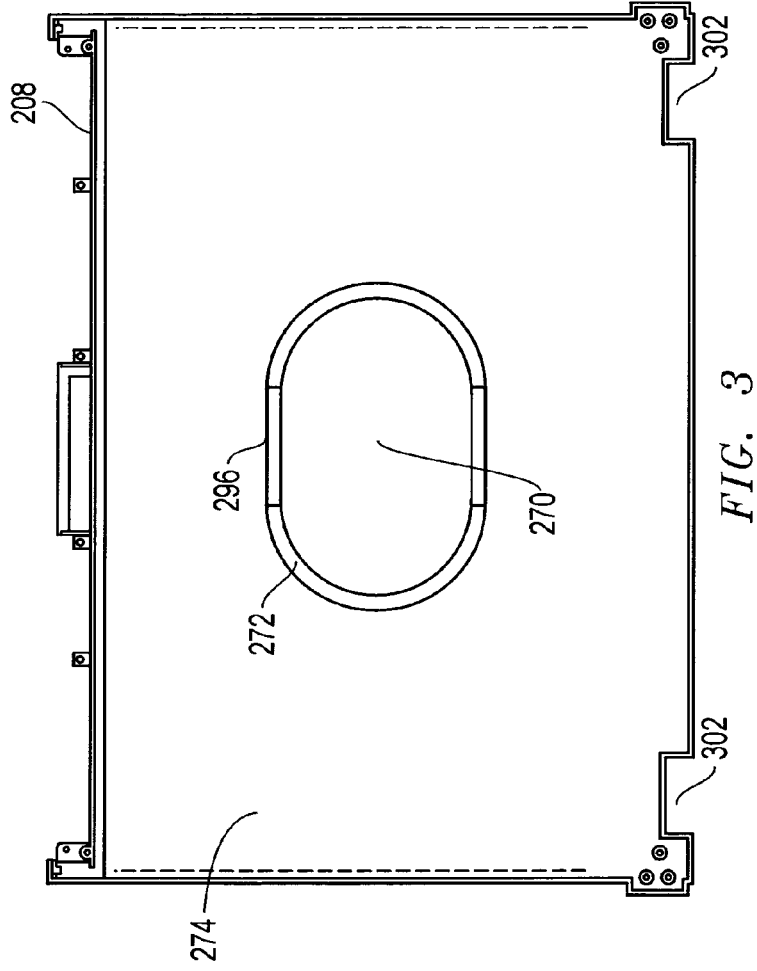
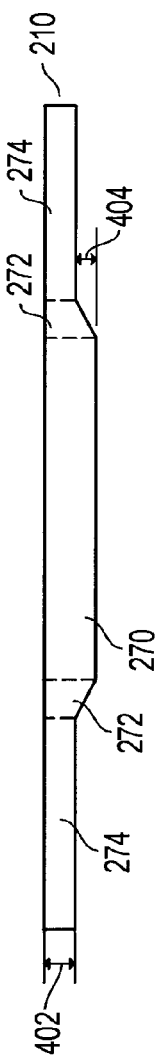

APPARATUS AND METHODS FOR SUPPORTING A DISPLAY PANEL OF A PORTABLE INFORMATION HANDLING SYSTEM

FIELD OF THE INVENTION

This invention relates generally to portable information handling systems and, more particularly, to display panels for portable information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

LCD displays are commonly employed for portable information handling systems configured in the form of laptop and notebook computers. The LCD display of a typical notebook computer is mounted within a display housing that is hingeably attached to a base housing that contains the keyboard for the notebook computer. Damage that may occur to LCD displays of notebook computers include "buffing" of the LCD display panel that can occur when the display housing and LCD display panel is subjected to bending from external forces such as may occur when items are stacked on top of the notebook computer or when the notebook computer is dropped upon a hard surface. Localized discolorations such as "white spots" may also be induced where a LCD panel is abraded due to contact with mounting components of the display housing. Thus, a minimum strength of LCD housing assembly is required in order to pass buffing and pogo tests.

In the past, some LCD display assemblies for notebook computers have employed a triangular-shaped display backing component that tapers in cross sectional thickness beginning at its outer periphery towards the center to provide a thickened middle section to improve strength and add minimal amount of material. This prior art design is illustrated in FIG. 1 which illustrates a partial side cross sectional view of a prior art portable information handling system 100 configured in the form of a notebook computer having a LCD display assembly 108 coupled by a hinge mechanism 192 to a base assembly 190 of the notebook computer 100. LCD display assembly 100 includes a cast magnesium display backing component 110 surrounded and attached to a housing frame 198 that is in turn coupled to a display bezel 130 with a LCD display panel 120 sandwiched and supported therebetween such that the light-emitting surface of LCD display panel 120 faces outward and away from display backing component 110. Together, cast magnesium display backing component 110 and display bezel 130 form a display housing for LCD display panel 120, the lower portion of which is provided with electrical connectors 122 for receiving display signals from processing components contained within base assembly 190 of notebook computer 100. As shown, cast magnesium display backing component 110 tapers in increasing thickness from each of the external edges 150 and 152 toward the centerline 160 of the display backing component 110 so as to provide a thickened middle section and triangular-shaped cross section. Inset cavities 106a and 106b are defined within each side of display backing component 110 as shown for purpose of mounting decorative manufacturer emblems.

U.S. Pat. No. 5,666,261 discloses another prior art solution for mounting a LCD panel to a laptop computer, in which a LCD is resiliently mounted to a light-weight stiff celled (honeycomb) composite sandwich panel to protect the LCD against breakage. However, the configuration of this solution adds a significant amount of thickness to the laptop computer.

SUMMARY OF THE INVENTION

Disclosed herein are apparatus and methods for mounting a display panel of a portable information handling system such as a notebook or laptop computer. In one embodiment, the disclosed apparatus and methods employ a display backing component having a stepwise-thickened central cross-sectional shape with a distribution of mass that is tailored to match the stress concentration of a display assembly. In this regard, the stepwise-thickened central cross section provides increased mass of display backing material at those portions of a display panel assembly (e.g., such as a LCD display panel) where most needed (i.e., where the display assembly stress concentration is greater), which allows for decreased mass of display backing material where it is less needed (i.e., where the display assembly stress concentration is less). Thus, in one exemplary embodiment a display panel may be configured with a thickened middle area that is surrounded by a thinner surrounding area.

Advantageously, the disclosed apparatus and methods may be implemented in one embodiment to provide a display backing component with stepwise-thickened central support feature that is capable of providing the same strength for supporting a display panel of a display assembly as a conventional display backing component, but with reduced mass of display backing material as compared to the mass of material required by the conventional display backing component to yield the same level of strength. Thus, the disclosed apparatus and methods may be employed in one embodiment to provide a display panel assembly for a portable information handling system which is as strong or stronger than corresponding conventional display panel assemblies, while at the same time having a maximum thickness that is thinner than the maximum thickness of corresponding conventional display panel assembly configurations. The disclosed apparatus and methods may also be employed in one embodiment to provide a display panel assembly for a portable information handling system which is as strong or stronger than corresponding conventional display panel assemblies, while at the same time being lighter in weight, and requiring less material than the corresponding conventional display panel assembly configurations.

In one exemplary embodiment, a display panel assembly may be provided with a stepwise-thickened central display backing component that acts to resist or substantially prevent display panel buffing and/or white spot formation (i.e., localized discoloration of the display panel due to abrasion) when the display panel assembly is subjected to external forces such as twisting, bending, or compressional forces.

In one respect, disclosed herein is a portable information handling system, including: a base assembly including one or more processors, one or more input/output devices, and one or more data storage devices; a display assembly including a display panel and a display backing component configured with a stepwise-thickened central support feature, the display panel being coupled to the display backing component such that the display panel is supported by the display backing component; and a hinge mechanism coupled between the display assembly and the base assembly.

In another respect, disclosed herein is a display assembly for a portable information handling system, including: a display panel; and a display backing component configured with a stepwise-thickened central support feature. The display panel is coupled to the display backing component such that the display panel is supported by the display backing component.

In another respect, disclosed herein is a method of mounting a display panel in a display assembly, including: providing a display panel, and a display backing component configured with a stepwise-thickened central support feature; and coupling the display panel to the display backing component to form a display assembly in which the display panel is supported by the display backing component.

BRIEF DESCRIPTION OF THE DRAWINGS

FIG. 3 is a front side view of a display backing sub-assembly according to one exemplary embodiment of the disclosed apparatus and methods.

FIG. 4 illustrates a side cross-sectional view of a display backing component according to one exemplary embodiment of the disclosed apparatus and methods.

DESCRIPTION OF ILLUSTRATIVE EMBODIMENTS

Figure 2A:
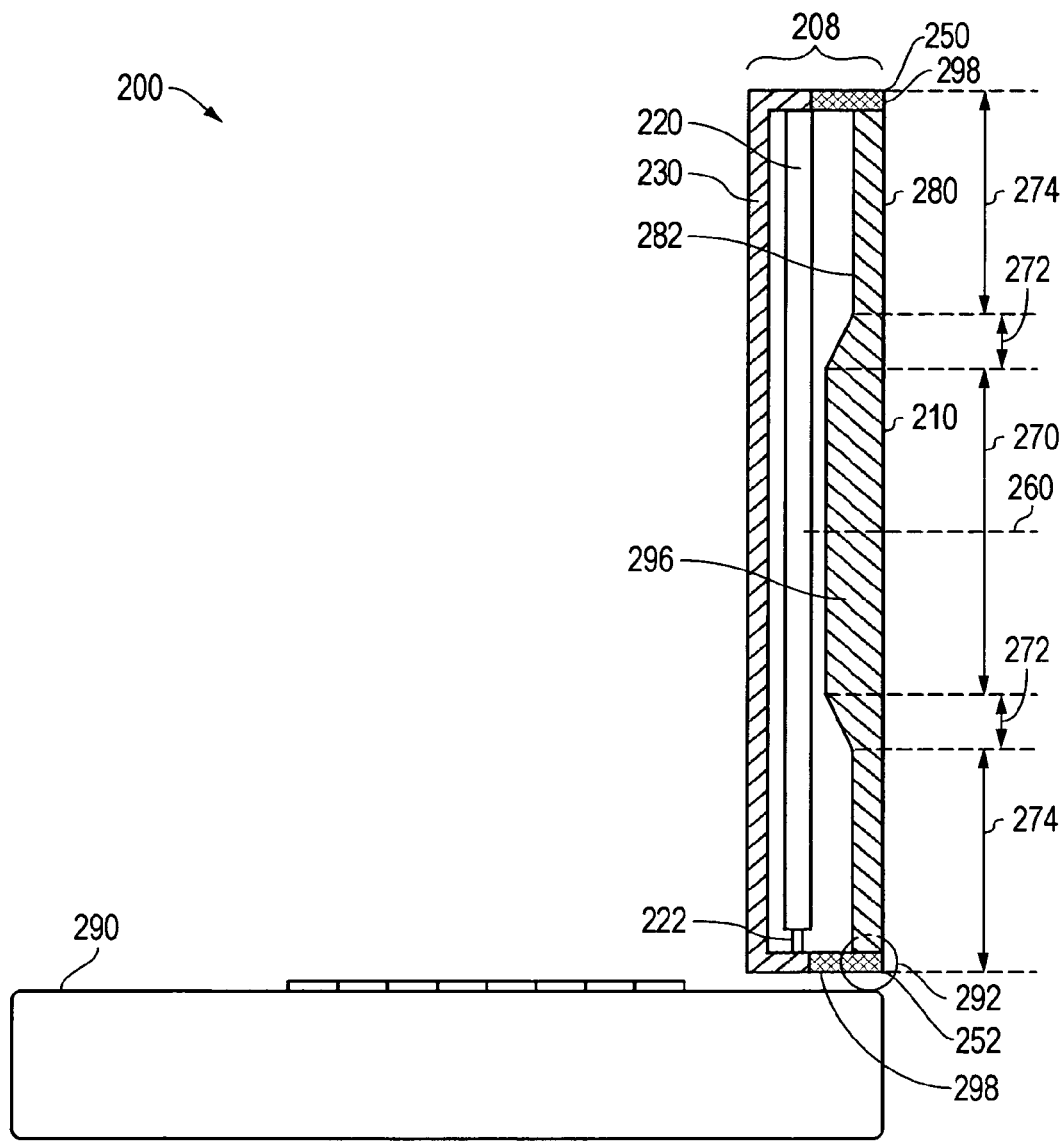
FIG. 2A illustrates a side partial cross sectional view of a portable information handling system according to one exemplary embodiment of the disclosed apparatus and methods.

FIG. 2A illustrates a side partial cross sectional view of a portable information handling system 200 according to one embodiment of the disclosed apparatus and methods. In this embodiment, information handling system 200 is configured in the form of a notebook computer having a display assembly 208 coupled by a hinge mechanism 292 to a base assembly 290 of the notebook computer 200 that may include one or more processors (central processing units, graphics processor unit/s, etc.), input/output devices (e.g., keyboard, touchpad, etc.), data storage devices (e.g. optical and/or magnetic drives, non-volatile storage, etc.). However, it will be understood that the disclosed apparatus and methods may be implemented with any other configuration of portable information handling system having a display assembly hingeably coupled to another (e.g., base component) of the information handling system, for example, PDA, MP-3 player, etc.

Still referring to the embodiment of FIG. 2A, display assembly 208 includes a display backing component 210 that is at least partially surrounded by and attached to a housing frame 298 that is in turn coupled to a display bezel 230 with a LCD display panel 220 sandwiched and supported therebetween such that the light-emitting surface of LCD display panel 220 faces outward and away from display backing component 210. Display panel 220 may be a LCD display panel or any other type of display panel (e.g., Tablet PC, cell phone, All-in-one-desktop, ultra-mobile personal computer "UMPC", PDA, etc.) that is suitable for use with a portable information handling system in structural configurations such as illustrated and described herein. As shown, the lower portion of display panel 220 may be provided with electrical connectors 222 for receiving display signals from processing components contained within base assembly 290 of portable information handling system 200. Together display backing component 210, housing frame 298, and display bezel 230 form a display housing for display panel 220.

In the practice of the disclosed apparatus and methods, display backing component 210 may be constructed of any material (e.g., cast or molded materials including metals such as magnesium, aluminum, zinc, etc. or plastics such as polycarbonate-acrylonitrile butadiene styrene alloy "PC-ABS", polyethylene terephthalate "PET", high impact polystyrene "HIPS", etc.) suitable for configuration with a stepwise-thickened central support feature as described further herein that provides adequate support for display panel 220 so as to resist or substantially prevent deformation (e.g., deflection) of display panel 220 when display assembly 208 is subjected to external forces such as twisting, bending, and/or compressional forces, e.g., so as to resist of substantially prevent display panel buffing and/or white spot formation when display assembly 208 is subjected to such external forces. Further information on display assembly components and mounting of display panels therewith may be found in U.S. Pat. No. 6,002,582, which is incorporated herein by reference in its entirety.

As shown in FIG. 2A, display backing component 210 is configured in this exemplary embodiment with a stepwise-thickened central support feature 296. As used herein, the term "stepwise-thickened central support feature" refers to any configuration of thickened central area of a display backing cross section that is surrounded by a thinner cross-sectional area, and that has the characteristic of transitioning in stepwise or incremented fashion from the surrounding thinner area to the thickened central area in one or more distinct thickening transition steps to provide at least one incremental and stepped thickness increase. In this regard, it will be understood that individual stepped transitions may be made at right angles (e.g., oriented 90 degrees from the major plane of the display backing) or may be of any other stepped transitional geometry (e.g., rounded concave steps, rounded convex steps, beveled or chamfered steps such as illustrated in FIGS. 2 and 4, etc.). Furthermore, although stepwise-thickened central support feature 296 is shown extending outward from front surface 282 of display backing component 210, it will be understood that a stepwise-thickened central support feature 296 may extend outward from either or both of front surface 282 or back surface 280 of a display backing component 210 as will be described further herein.

In the embodiment of FIG. 2A, display backing component 210 has a substantially planar back surface 280 and a front surface 282 that is shaped to provide display backing component 210 with a shaped (non-planar) surface. In particular, display backing component 210 is provided with stepwise-thickened central support feature 296 that includes a thickened middle area 270 that provides increased display backing component material thickness (and mass) at a location intersected by a centerline 260 of display backing component 210 that is oriented perpendicular to the major (i.e., primary) plane of display backing component 210. Thickened middle area 270 is surrounded by thinner (and in this exemplary embodiment, substantially planar) thinner surrounding area 274 that provides decreased display backing component material thickness (and mass) around middle area 270 and extending toward the peripheral edges of display backing component 210, which may or may not be the same thickness as the thinner surrounding area 274. As shown, thickness of display backing component 210 transitions between middle area 270 and surrounding area 274 in stepped transition area 272 that that provides a first incremental and stepped thickness increase and defines a chamfered surface.

Figure 2B:
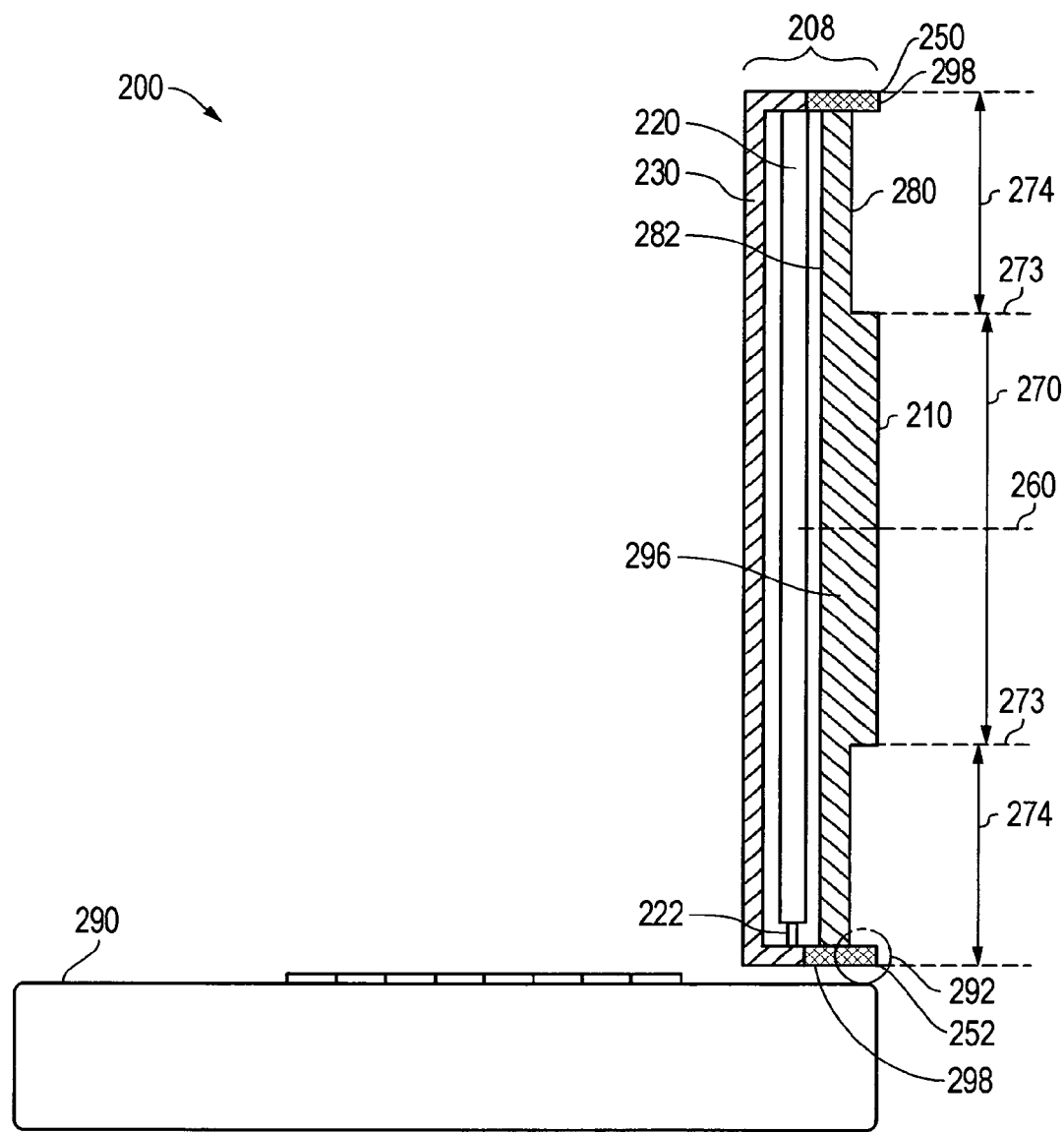
FIG. 2B illustrates a side partial cross sectional view of a portable information handling system according to one exemplary embodiment of the disclosed apparatus and methods.

FIG. 2B illustrates a portable information handling system 200 configured with an alternative embodiment of display backing component 210 in which display backing component 210 has a substantially planar front surface 282 and a back surface 280 that is shaped to provide display backing component 210 with a shaped (non-planar) surface. As shown for the exemplary embodiment of FIG. 2B, thickness of display backing component 210 transitions between middle area 270 and surrounding area 274 at stepped transition point 273 to provide an incremental and stepped thickness increase that defines an abrupt vertical transition at a right angle (e.g., oriented 90 degrees from the major plane of display backing component 210).

Figure 2C:
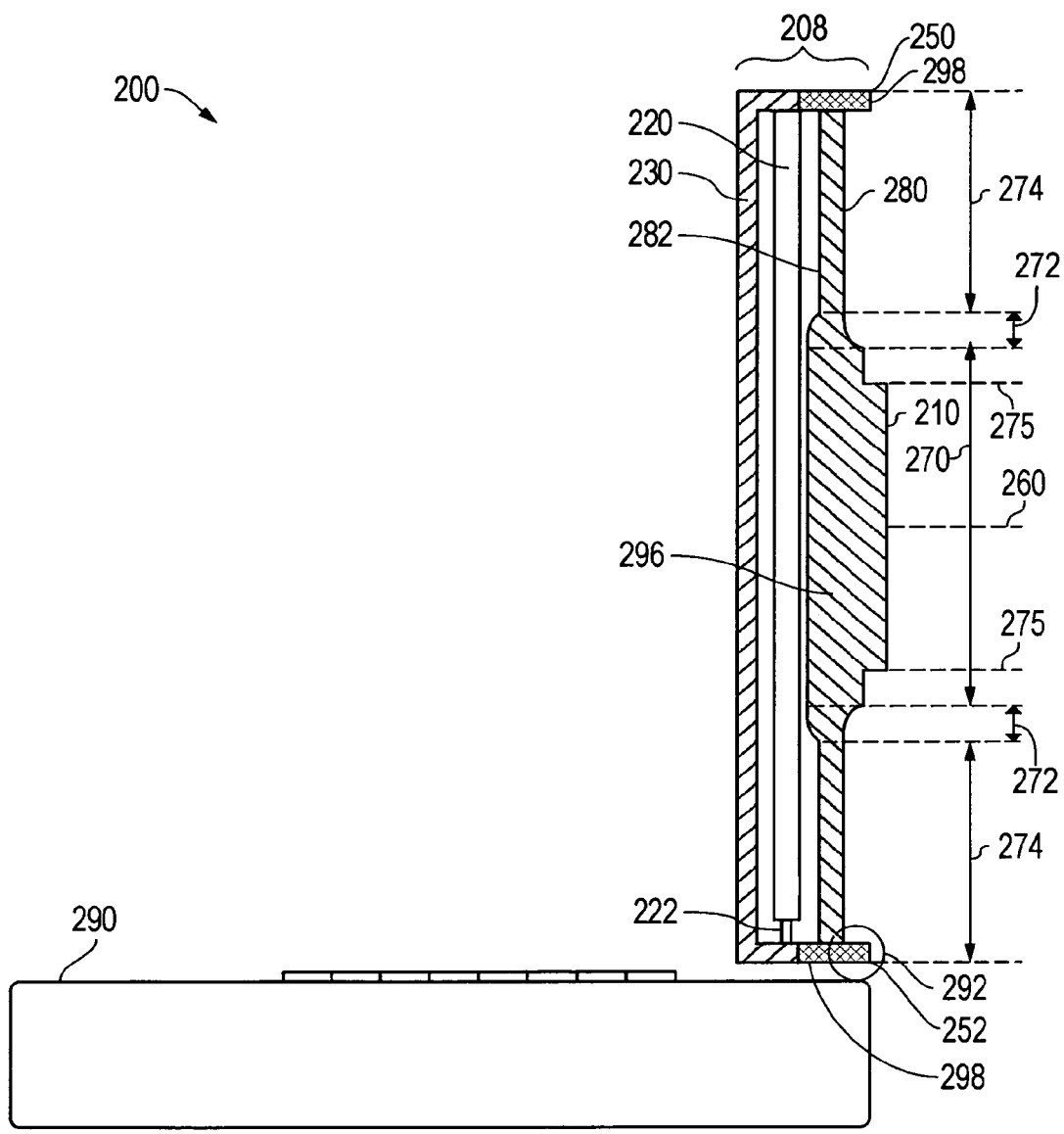
FIG. 2C illustrates a side partial cross sectional view of a portable information handling system according to one exemplary embodiment of the disclosed apparatus and methods.

FIG. 2C illustrates a portable information handling system 200 configured with another alternative embodiment of display backing component 210 in which display backing component 210 has a front surface 282 and a back surface 282 that are both non-planar shaped. As shown, thickness of display backing component 210 transitions between middle area 270 and surrounding area 274 in a first stepped transition area 272 that provides a first incremental and stepped thickness increase and defines a rounded convex surface on front surface 282 and a rounded concave surface on back surface 280. Further an additional and second incremental and stepped thickness increase is provided by stepped transition point 275 on back surface 282 that defines an abrupt vertical transition at a right angle (e.g., oriented 90 degrees from the major plane of display backing component 210).

Using the configuration of FIGS. 2A-2C, an increased mass of display backing material is provided for display backing component 210 at the central portion of display assembly 208 where the display assembly stress concentration is typically greater under conditions of external force, and a decreased (e.g., minimized) mass of display backing material is provided for display backing component 210 at the peripheral portions of display assembly 208 where display assembly stress concentration is typically less under conditions of external force. Because a reduced mass of material is provided for the surrounding area 274 of display backing component 210 overall weight of display backing material is reduced, while the increased mass provided for middle area 270 of display backing component 210 provides sufficient strength where stress concentration is greatest when display assembly 208 is exposed to a given external force.

FIG. 3 is a front side view of a display backing sub-assembly including the exemplary display backing component 210 and outer housing frame 298 of FIG. 2A. Display backing component 210 and outer housing frame 298 may be coupled together by, for example, fasteners, brackets, adhesive, etc. As shown in FIG. 3, display backing component 210 has an overall (major axis) length L and overall (minor axis) width W, and is provided with a stepwise-thickened central support feature 296 that includes thickened middle area 270 surrounded by thinner surrounding area 274 in a configuration as previously described. Display backing component 210 is also provided with slots 302 for receiving hinge mechanisms 292. As further shown, the stepwise-thickened central support feature 296 of FIG. 3 is configured with an elongated oval shape (i.e., "race track" shape) having a major axis length $P_L$ and a minor axis width $P_W$. In this exemplary embodiment, major axis length $P_L$ is equal to display backing component length L divided by 2.65 (i.e., $P_L=L/2.65$), and minor axis width $P_W$ is equal to display backing component width W divided by 3 (i.e., $P_W=L/3$). However, in another embodiment, $P_L$ may be selected to be equal to L/x, where x may range in value of from about 2 to about 4, and $P_W$ may be selected to be equal to W/y, where y may range in value from about 2 to about 4, although other dimensions are also possible, i.e., value of x may be less than about 2 or greater than about 4, and value of y may be less than about 2 or greater than about 4.

Selection of the particular relationship between dimensions $P_W$, $P_L$ of stepwise-thickened central support feature 296 and overall dimensions L, W of a given display backing component 210 may be made to provide any values of $P_W$, $P_L$ that provide a stepwise-thickened central support feature configuration suitable for providing increased mass of display backing material at a position within a display panel assembly such that the display backing component is effective to support a display panel of the display panel assembly in a manner that resists or substantially prevents deformation of the display panel when the display panel assembly is subjected to one or more external forces, while at the same time having a reduced overall mass of the display backing component as compared to the mass of a conventional planar display backing component of uniform thickness that achieves a comparable resistance or prevention of deformation of the display panel to the same one or more external forces.

In one exemplary embodiment, a finite element model of a given display assembly configuration may be constructed and a series of finite element analyses (e.g., a series of 36 element finite element analyses) may be performed by applying external forces to the display assembly with varying display back geometries to determine resulting modeled stresses and displacements in the display assembly in order to further optimize the particular geometry of a stepwise-thickened central support feature that is selected for use for the given display assembly configuration. This may be accomplished, for example, by fixing four corners from translating in the X, Y and Z axis and allowing these four corners to rotate in the X, Y and Z axis.

FIG. 4 illustrates a side cross-sectional view of the exemplary display backing component 210, showing nominal thickness 402 of surrounding area 274 that may be selected to be dependent on the overall size of the display assembly 208 with which display backing component 210 is to be assembled in combination with the type of material from which display backing component 210 is composed, and the desired level of stress and deformation reduction. For example, thickness 402 of surrounding area 274 may be minimized subject to manufacturing cost concerns and/or required level of strength for supporting a display panel with desired resistance to deformation when combined with thickness 404 of middle area 270. In turn, thickness 404 of middle area 270 may be maximized after assembly and manufacturing tolerances are accounted for, e.g., so that thickness 404 falls within these tolerances. Further, the beveled or chamfered shape of stepped transition area 272 between surrounding area 274 and middle area 270 is not necessary, e.g., stepped transition area 272 may be an abrupt vertical (i.e., non-chamfered) transition between surrounding area 274 and middle area 270 or may be of any other suitable transition configuration (e.g., rounded concave, rounded convex, etc.).

Figure 1:
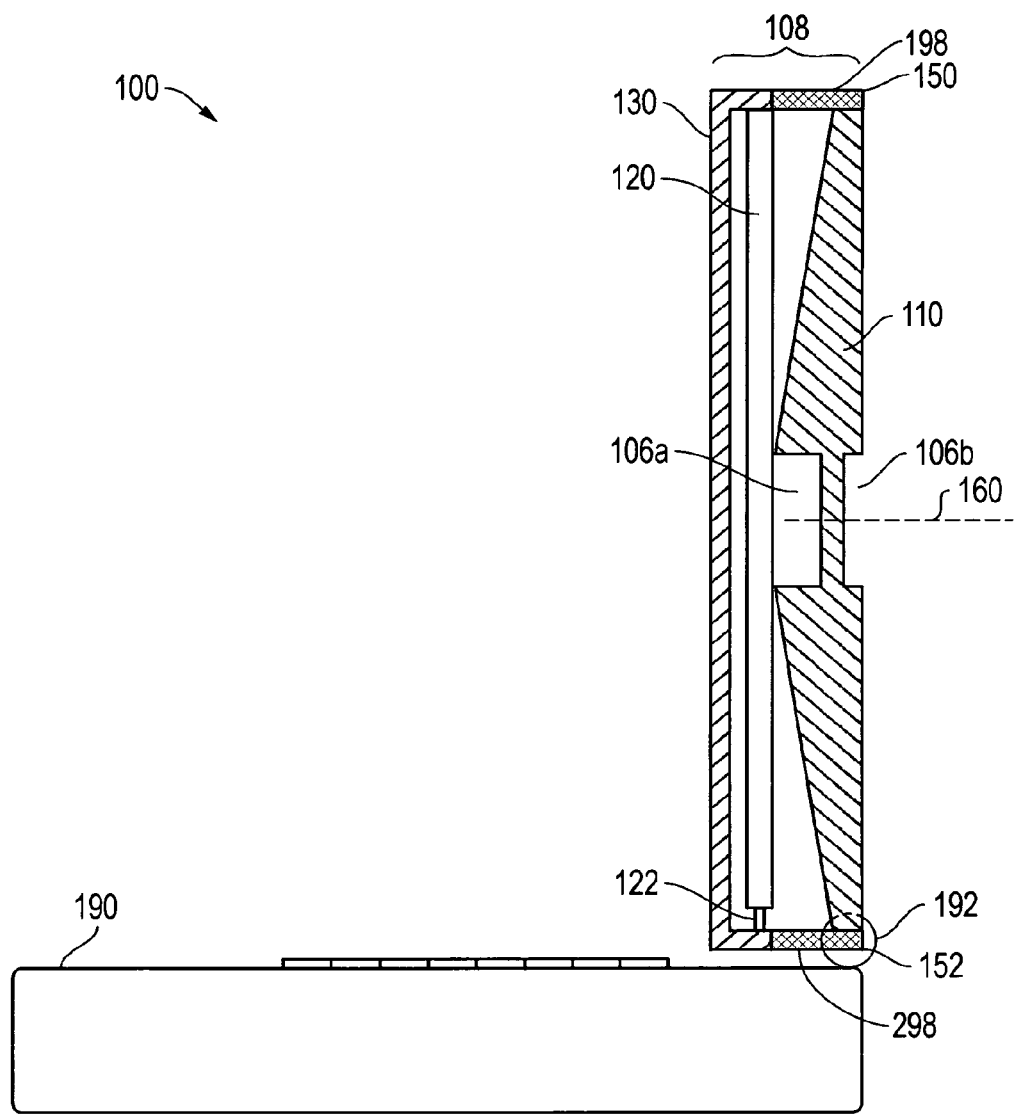
FIG. 1 illustrates a partial side cross sectional view of a prior art a partial side cross sectional view of a prior art notebook computer.

In one exemplary embodiment, a cast magnesium display backing component 210 having a mass of about 293 grams and suitable for mounting and supporting a LCD display panel of 380 mm by 230 mm in dimensions may be provided having exemplary dimensions of L=about 400 mm, W=about 250 mm, $P_L$=about 15 mm, and $P_W$=about 83 mm. In this same exemplary embodiment, thickness 402 of surrounding area 274 may be configured to be about 1.5 mm, and thickness 404 of middle area 270 may be configured to be about 1 mm. When such an exemplary embodiment of display backing component is employed in a display assembly, an improvement of about 22% in display panel deflection and stress reduction may be achieved in one embodiment as compared to a conventional display panel assembly of FIG. 1 having a display backing component of the same mass. In another embodiment, substantially the same display panel deflection and stress resistance characteristics may be achieved with this exemplary embodiment of display backing component as a conventional display panel assembly of FIG. 1, but with about 8% less display backing component mass.

It will be understood that the particular configuration of stepwise-thickened central support feature 296 illustrated and described herein is exemplary only, and that any other lengths, widths and/or thicknesses of stepwise-thickened central support feature relative to the surrounding area of a display backing component may be employed that are suitable for supporting a display panel of a display assembly against anticipated external forces. Furthermore, it will be understood that any other shapes besides "race track" shape (e.g., rectangular, square, circular, oval, triangular etc.) of stepwise-thickened central support feature (i.e., as viewed from the planar front side view of a display back) may be employed that are suitable for supporting a display panel of a display assembly against such anticipated external forces.

Figure 5:
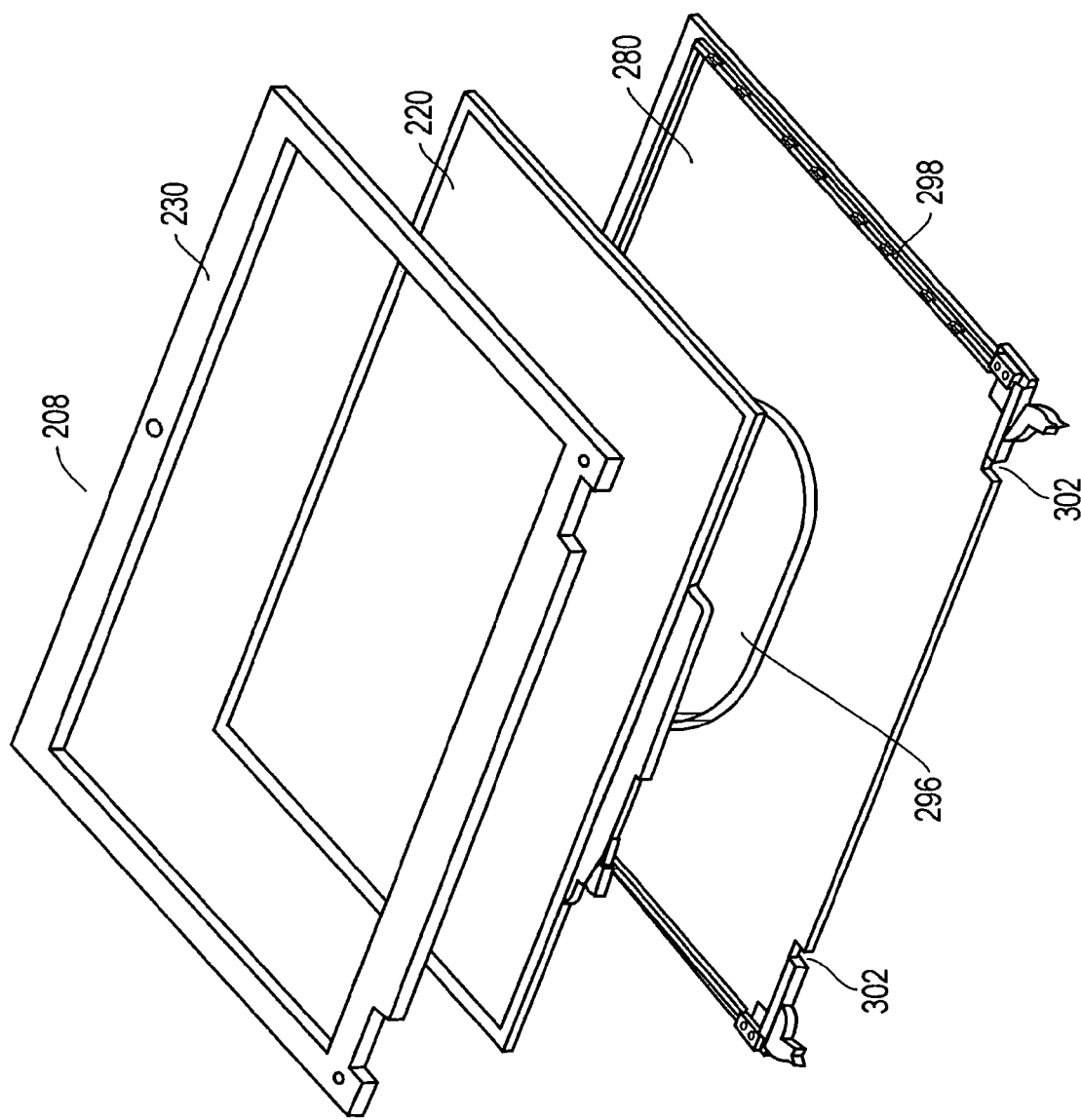
FIG. 5 is an exploded perspective view of a display assembly according to one exemplary embodiment of the disclosed apparatus and methods.
Figure 6:
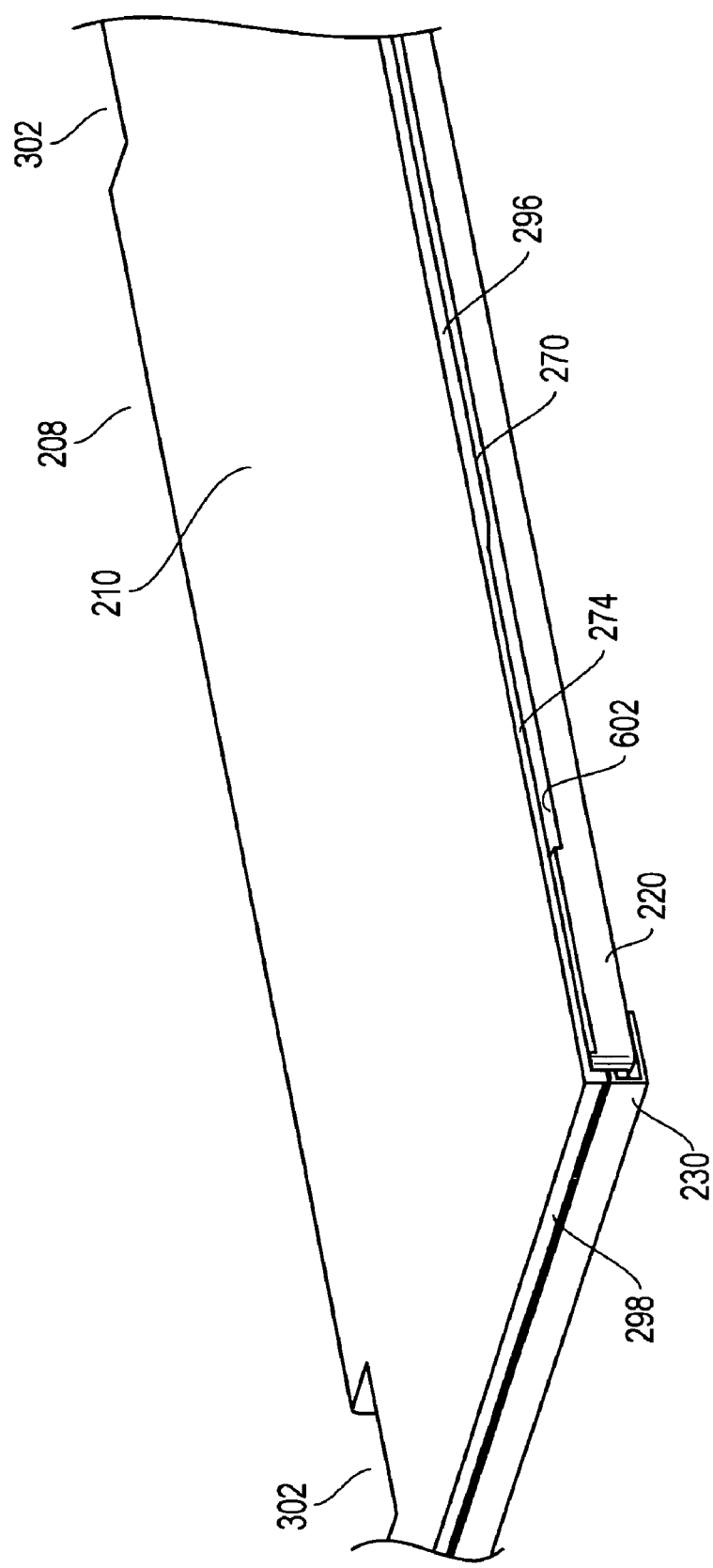
FIG. 6 shows a partial perspective cross sectional view of a display assembly according to one exemplary embodiment of the disclosed apparatus and methods.

FIG. 5 is an exploded perspective view of display assembly 208, showing interrelation of display bezel 230 with a display backing sub-assembly that includes display backing component 210 attached to housing frame 298, with LCD display panel 220 positioned for assembly therebetween. FIG. 6 shows a partial perspective cross sectional view of display assembly 208 after assembly. In the illustrated embodiment, space 602 existing between the surface of LCD display panel 220 and surface of surrounding area 274 of display backing component 210 defines a cavity in which connectors, wires or other internal display assembly components may be positioned.

Figure 7:
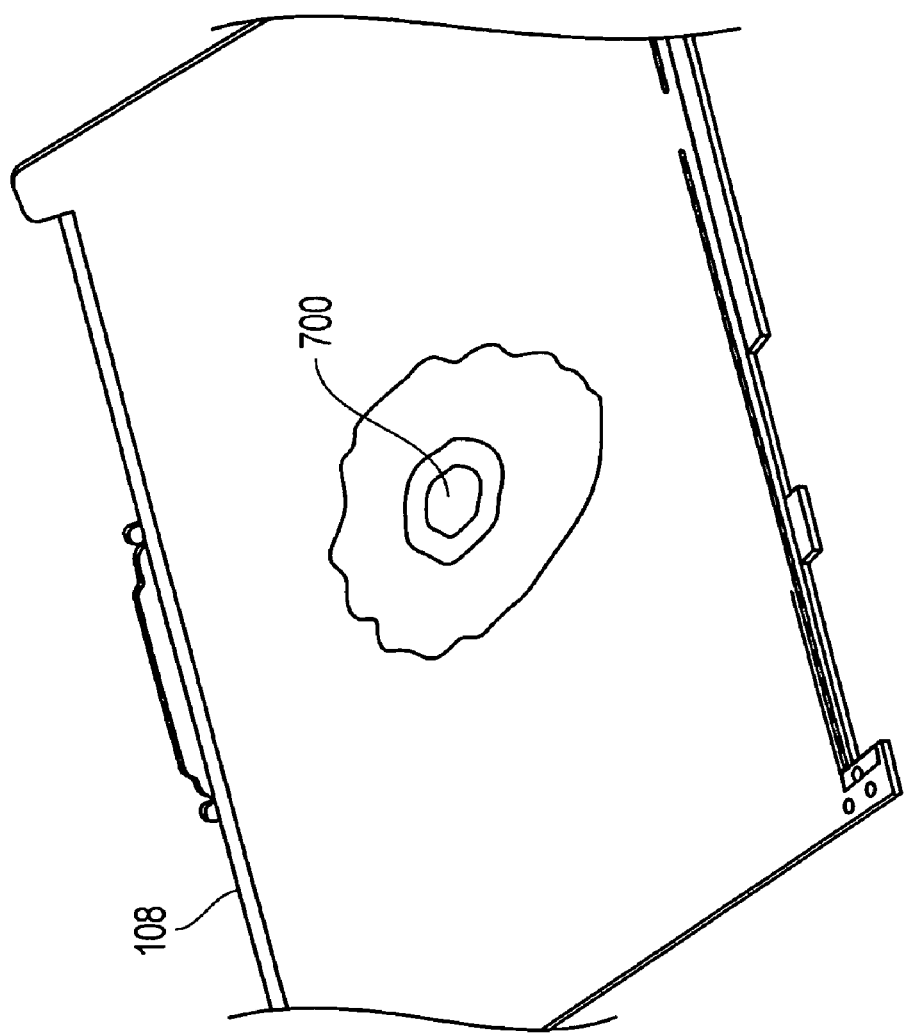
FIG. 7 shows a stress distribution pattern for the prior art LCD display assembly of FIG. 1.
Figure 8:
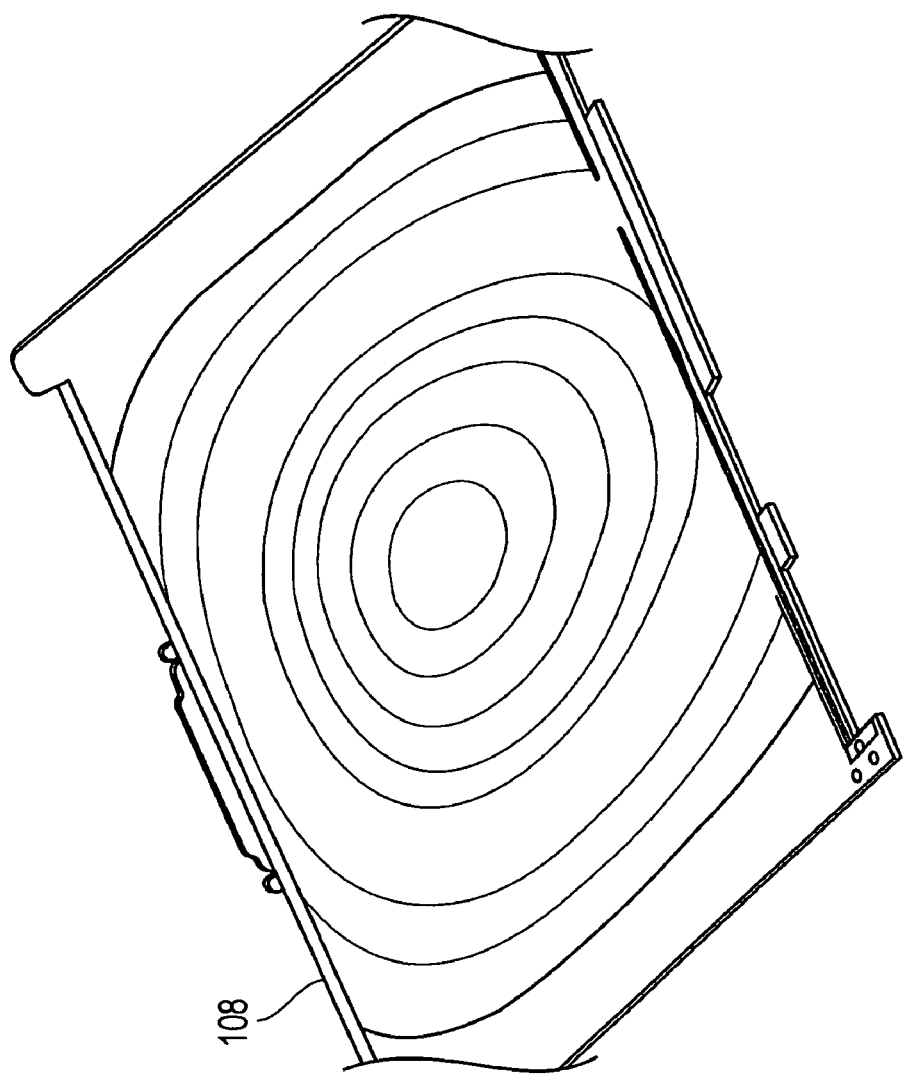
FIG. 8 shows displacement pattern of the prior art LCD display assembly of FIG. 1.

FIG. 7 shows stress distribution pattern for prior art LCD display assembly 108 as it is subjected to a lateral force applied perpendicular to the plane of the display assembly 108 at the center of the display assembly 108. As may be seen in FIG. 7, region of maximum stress 700 occurs at the center of display assembly 108. FIG. 8 shows displacement (i.e., deformation) pattern of prior art LCD display assembly 108 resulting from the stress of FIG. 7. As may be seen in FIG. 8, maximum displacement also occurs at the center of display assembly 108. When severe enough, such displacement may lead to display panel buffing and/or white spot formation on a LCD display panel. In one exemplary embodiment, the disclosed stepwise-thickened central display backing component described herein in relation to FIGS. 2-6 may be advantageously configured and employed to provide a display assembly that is reinforced with increased material mass to counteract stress and resulting display assembly deformation at those portions of a display assembly where the display assembly stress concentration is greatest when the display assembly is exposed to one or more external forces such as a lateral force as described above or other forces described elsewhere herein, and that has a reduced material mass at those portions of the display assembly where the display assembly stress concentration is least when the display assembly is exposed to a corresponding external force/s, thus minimizing the weight of the display assembly.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. A portable information handling system, comprising:
   a base assembly comprising one or more processors, one or more input/output devices, and one or more data storage devices;
   a display assembly comprising a display panel and a display backing component configured with a stepwise-thickened central support feature, said display panel being coupled to said display backing component such that said display panel is supported by said display backing component; and a hinge mechanism coupled between said display assembly and said base assembly;
  wherein said stepwise-thickened central support feature includes a thickened middle area that is surrounded on all sides by a thinner surrounding area.

2. The portable information handling system of claim 1, wherein said display backing component has a major plane; wherein said thickened middle area is intersected by a centerline of said display backing component that is oriented perpendicular to said major plane of said display backing component; wherein said display panel has a back surface and a front light-emitting surface; wherein said display backing component has a substantially planar back surface and a front surface that is shaped to define said stepwise-thickened central support feature thereon; and wherein said display panel is coupled to said display backing component with said front surface of said display backing component oriented to face said back surface of said display panel.

3. The portable information handling system of claim 1, wherein said display panel comprises an LCD display panel; and wherein said portable information handling system comprises a notebook computer.

4. The portable information handling system of claim 1, wherein said stepwise-thickened central support feature provides increased mass of display backing material at a position within said display panel assembly such that said display backing component is effective to support said display panel in a manner that resists or substantially prevents deformation of said display panel when said display assembly is subjected to one or more external forces.

5. The portable information handling system of claim 1, said thickened middle area providing an increased mass of display backing material at a portion of said display panel assembly at which a stress concentration is greatest when said display assembly is exposed to an external lateral force applied perpendicular to the major plane of said display assembly at the center of said display assembly, and said thinner surrounding area providing a decreased mass of display backing material at a portion of said display panel assembly at which a stress concentration is less than at said location of said thickened middle area when said display assembly is exposed to an external lateral force applied perpendicular to the major plane of said display assembly at the center of said display assembly.

6. The portable information handling system of claim 1, wherein said display backing component has a major axis length dimension (L) and a minor axis width dimension (W); wherein said stepwise-thickened central support feature has a major axis length ($P_L$)=L/x, where x is from about 2 to about 4 and wherein said stepwise-thickened central support feature has a minor axis width ($P_W$)=W/y, where y is from about 2 to about 4.

7. A display assembly for a portable information handling system, comprising:
  a display panel; and
  a display backing component configured with a stepwise-thickened central support feature, said stepwise-thickened central support feature including a thickened middle area that is surrounded on all sides by a thinner surrounding area;
  wherein said display panel is coupled to said display backing component such that said display panel is supported by said display backing component.

8. The display assembly of claim 7, wherein said display backing component has a major plane; and wherein said thickened middle area is intersected by a centerline of said display backing component that is oriented perpendicular to said major plane of said display backing component.

9. The display assembly of claim 8, wherein said display panel has a back surface and a front light-emitting surface; wherein said display backing component has a substantially planar back surface and a front surface that is shaped to define said stepwise-thickened central support feature thereon; and wherein said display panel is coupled to said display backing component with said front surface of said display backing component oriented to face said back surface of said display panel.

10. The display assembly of claim 9, further comprising a housing frame and a display bezel, said housing frame being coupled to said display bezel with said display backing component and said display panel positioned therebetween; wherein said housing frame is disposed adjacent said back surface of said display panel component and said display bezel is disposed adjacent said front light-emitting surface of said display panel.

11. The display assembly of claim 7, wherein said stepwise-thickened central support feature provides increased mass of display backing material at a position within said display panel assembly such that said display backing component is effective to support said display panel in a manner that resists or substantially prevents deformation of said display panel when said display assembly is subjected to one or more external forces.

12. The display assembly of claim 7, said thickened middle area providing an increased mass of display backing material at a portion of said display panel assembly at which a stress concentration is greatest when said display assembly is exposed to an external lateral force applied perpendicular to the major plane of said display assembly at the center of said display assembly, and said thinner surrounding area providing a decreased mass of display backing material at a portion of said display panel assembly at which a stress concentration is less than at said location of said thickened middle area when said display assembly is exposed to an external lateral force applied perpendicular to the major plane of said display assembly at the center of said display assembly.

13. The display assembly of claim 7, wherein said display backing component has a major axis length dimension (L) and a minor axis width dimension (W); wherein said stepwise-thickened central support feature has a major axis length ($P_L$)=L/x, where x is from about 2 to about 4 and wherein said stepwise-thickened central support feature has a minor axis width ($P_W$)=W/y, where y is from about 2 to about 4.

14. A method of mounting a display panel in a display assembly, comprising:
  providing a display panel, and a display backing component configured with a stepwise-thickened central support feature, said stepwise-thickened central support feature including a thickened middle area that is surrounded on all sides by a thinner surrounding area; and
  coupling said display panel to said display backing component to form a display assembly in which said display panel is supported by said display backing component.

15. The method of claim 14, wherein said display backing component has a major plane; wherein said thickened middle area is intersected by a centerline of said display backing component that is oriented perpendicular to said major plane of said display backing component; wherein said display panel has a back surface and a front light-emitting surface; wherein said display backing component has a substantially planar back surface and a front surface that is shaped to define said stepwise-thickened central support feature thereon; and wherein said method further comprises coupling said display panel to said display backing component with said front surface of said display backing component oriented to face said back surface of said display panel.

16. The method of claim 14, further comprising providing a portable information handling system base assembly that includes one or more processors, one or more input/output devices, and one or more data storage devices; and hingeably coupling said portable information handling system base assembly to said display assembly.

17. The method of claim 16, wherein said display panel comprises an LCD display panel; and wherein said portable information handling system base assembly comprises a notebook computer.

18. The method of claim 14, wherein said stepwise-thickened central support feature provides increased mass of display backing material at a position within said display panel assembly such that said display backing component is effective to support said display panel in a manner that resists or substantially prevents deformation of said display panel when said display assembly is subjected to one or more external forces.

19. The method of claim 14, said thickened middle area providing an increased mass of display backing material at a portion of said display panel assembly at which a stress concentration is greatest when said display assembly is exposed to an external lateral force applied perpendicular to the major plane of said display assembly at the center of said display assembly, and said thinner surrounding area providing a decreased mass of display backing material at a portion of said display panel assembly at which a stress concentration is less than at said location of said thickened middle area when said display assembly is exposed to an external lateral force applied perpendicular to the major plane of said display assembly at the center of said display assembly.

20. The method of claim 14, wherein said display backing component has a major axis length dimension (L) and a minor axis width dimension (W); wherein said stepwise-thickened central support feature has a major axis length $(P_L)=L/x$, where x is from about 2 to about 4 and wherein said stepwise-thickened central support feature has a minor axis width $(P_W)=W/y$, where y is from about 2 to about 4.

21. An information handling system, comprising:
a display panel; and
a display backing component having front and back opposing sides, the front side of the display backing component having a surface that is shaped to define a stepwise-thickened central support feature thereon, and the opposing back side of the display backing component being shaped to be substantially planar across its surface;
wherein said display panel is coupled to said display backing component to form a display assembly in which said display panel is supported by said display backing component.

22. The information handling system of claim 21, wherein said display panel has a back surface and a front light-emitting surface; and wherein said display panel is coupled to said display backing component with said front surface of said display backing component oriented to face said back surface of said display panel.

23. The information handling system of claim 21, further comprising:
a base assembly comprising one or more processors, one or more input/output devices, and one or more data storage devices; and
a hinge mechanism coupled between said display assembly and said base assembly.

24. A method of mounting a display panel in a display assembly, comprising:
providing a display panel;
providing a display backing component having front and back opposing sides, the front side of the display backing component having a surface that is shaped to define a stepwise-thickened central support feature thereon, and the opposing back side of the display backing component being shaped to be substantially planar across its entire surface; and
coupling said display panel to said display backing component to form a display assembly in which said display panel is supported by said display backing component.

25. The method of claim 24, wherein said display panel has a back surface and a front light-emitting surface; and wherein said method further comprises coupling said display panel to said display backing component with said front surface of said display backing component oriented to face said back surface of said display panel.

26. The method of claim 24, further comprising providing a portable information handling system base assembly that includes one or more processors, one or more input/output devices, and one or more data storage devices; and hingeably coupling said portable information handling system base assembly to said display assembly.

* * * * *